Patented July 27, 1943

2,325,411

UNITED STATES PATENT OFFICE 2,325,411

MERCURY DERIVATIVES OF ESTERS OF SULPHOCARBOXYLIC ACIDS

Kathryn L. Lynch, Old Greenwich, Conn., assignor to American Cyanamid Company, New York, N. Y., a corporation of Maine No Drawing. Application February 1, 1941, Serial No. 376,986

11 Claims. (Cl. 260—431)

This invention relates to a new class of organic mercury compounds and to methods of preparing the same. More specifically, it relates to mercury derivatives of esters of sulphocarboxylic acids which have wetting, detergent, insecticidal, fungicidal and bactericidal properties.

I have discovered that a new class of organic mercury compounds may be prepared by reacting the normal esters of sulphocarboxylic acids with mercuric oxide. The organic mercury compound thus obtained when treated with a mild alkali is recovered as the mercury derivative of the normal ester of alkali metal or ammonium sulphocarboxylic acid. My new compounds vary from light yellow to dark red in color, from viscous liquids to hard waxy solids, soluble in most organic solvents and sparingly soluble in water and alcohol.

The esters of sulphocarboxylic acids which I use in preparing my new organic mercury compounds are of various types. Sulphocarboxylic acid esters of aliphatic alcohols such as methyl, ethyl, propyl, capryl, ethyl hexyl, methyl-amyl, lauryl, and the like; alicyclic alcohols such as cyclohexanol; terpene alcohols such as fenchyl; phenols, cresols, naphthols, etc.; and the mixed esters of sulphodicarboxylic acids such as ethyl-amyl, methyl-octyl, etc., may be employed. Esters of sulphocarboxylic acids such as sulphosuccinic, sulphosuberic, sulphosebacic, sulphophthalic, sulphobutyric, sulphopropionic and sulphostearic with any of the alcohols mentioned above are also suitable for use in my process. Only normal, or saturated, esters are employed since HgO may react with a free acid group.

The esters of the sulphocarboxylic acids are reacted with HgO in the form of their free sulphonic acids. When the sulphocarboxylic acid esters are not readily obtainable as the free sulphonic acid it is sometimes more expedient to hydrolyze an alkali metal or ammonium sulphonate of the desired carboxylic acid ester to obtain the corresponding free sulphonic acid carboxylic acid ester. Usually I prepare sulphonic acid carboxylic acid esters for use in my process by dissolving the desired alkali metal or ammonium sulphonate of a carboxylic acid ester in a suitable solvent, cooling the solution, and thereafter treating with an acid such as HCl or $H_2SO_4$ whereby the alkali metal or ammonium sulphonate is converted to the corresponding sulphonic acid. The temperature of the reaction mixture should be low during this reaction in order to avoid hydrolysis of the compound at the ester linkage.

The preparation of my new class of compounds is carried out by reacting the sulphonic acid carboxylic acid ester, dissolved in a suitable solvent, with HgO at low temperatures. A reasonable amount of care should be exercised in selecting the solvent employed since certain common solvents such as alcohol and acetone will react with mercuric oxide. I have found that ethers may be used very satisfactorily in my process since they dissolve the sulphocarboxylic acid esters fairly well, are easily obtained and handled and do not react with HgO under the reaction conditions employed. Other suitable inert solvents such as mineral spirits may, of course, be employed.

The reaction with HgO is carried out in the cold, below 15° C., and preferably at about 4–5° C. in order to prevent so far as possible undesirable side reactions. The time required for the reaction varies considerably depending principally upon the yields desired. In some cases enough HgO will be dissolved and reacted within a few minutes to produce a compound having the desired amount of mercury chemically combined therewith. In other instances, as for example when it is desired to add equimolecular amounts of mercury to the sulphonic acid carboxylic acid ester, the reaction may require upwards of 70 hours for completion. As indicated by the equations given in Example 1 it is possible to react one mole of HgO with one mole of the sulphonic acid carboxylic acid ester. However, as generally found in organic reactions of this type it is virtually impossible to carry the reaction to theoretical completion and accordingly I may use less than one mole of HgO for each mole of the sulphonic acid when a completely mercurated compound is not required. Agitation of the reaction mixture aids materially in speeding up the reaction especially during its early stages. When the reaction has proceeded to the desired stage of completion the unreacted HgO and other insoluble impurities may be removed by filtration of the solution with charcoal and/or a filter aid.

The solution obtained from the reaction discussed above contains an organically bound mercury derivative of the ester of a sulphocarboxylic acid. It is not practical to recover this product in the form in which it appears in the solution at this stage of the process because of its instability. Accordingly I recover the product by neutralizing it with a mild alkali and then evaporating the solution. Since strong alkalies such as sodium carbonate and sodium hydroxide will decompose the mercury derivative it is necessary to neutralize the solution with a mild alkali such as sodium, potassium or ammonium bicarbonate. Other mild alkalies which do not attack the mercuric derivative may also be employed in this neutralization step. Following neutralization the solution may be filtered and then evaporated to yield the compound in the form of the mercury derivative of the ester of alkali metal or ammonium sulphocarboxylic acid.

Of the various esters of sulphocarboxylic acids I prefer to use the aliphatic esters of sulpho-aliphatic carboxylic acids such as sulpho-succinic acid since the mercury derivatives of these esters have particularly good wetting and detergent properties. Those sulphosuccinic acid esters with short aliphatic chains such as methyl or ethyl yield mercury derivatives which are fairly water-soluble. Those sulphosuccinic acid esters having long chains such as the dioctyl sulphosuccinic acid ester are less water-soluble but have excellent wetting properties.

The mercury derivatives of esters of sulphosuccinic acid have, I believe, the following probable structural formula:

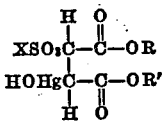

in which X is a salt-forming radical and R and R' are alkyl radicals. As in the case of most organic mercury compounds the exact structure of my mercury derivatives is not definitely known. I have, however, in Example 1 indicated what I believe to be the course of the reactions involved and have illustrated what I believe to be the probable structural formula of the mercury derivative of the dioctyl ester of sodium sulphosuccinate. Since the structure may be otherwise, however, I do not intend to be limited by the particular structure shown but intend to include within the scope of the appended claims all those mercury derivatives of esters of sulphocarboxylic acids prepared according to my process as outlined herein.

Because of the combined wetting and detergent and antiseptic properties of my organic mercury compounds they are of considerable value in the preparation of antiseptic solutions and soaps of various kinds, washing and scrubbing compositions and the like. Because of their wetting power they are of particular value in the preparation of fungicidal and insecticidal sprays where complete wetting and coverage is required. They may also be used in the preparation of topical preparations where penetration is a desired factor.

My invention will now be illustrated more specifically by means of the following specific examples which are given by way of illustration and not of limitation.

*Example 1*

111 parts of dioctyl sodium sulphosuccinate was dissolved in 181 parts by weight of di-isopropyl ether and cooled to 4–5° C. 32.2 parts by weight of concentrated HCl (35%) was added slowly with agitation, keeping the temperature below 15° C. to prevent hydrolysis of the ester and to decrease the solubility of the NaCl formed in the reaction:

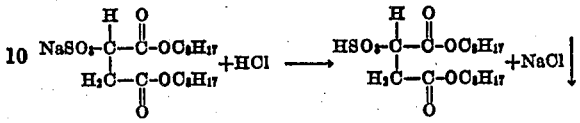

After standing one hour at 4–5° C. the precipitated NaCl was filtered off, and washed with cold ether.

28 parts by weight of HgO was added, with agitation, to the combined filtrate and washings, keeping the temperature at 4–5° C. All of the HgO was dissolved within 15 minutes to give a clear pale yellow solution. The reaction is believed to be:

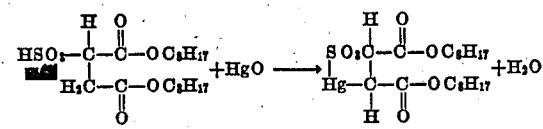

21 parts by weight of NaHCO₃ was then added with agitation and dissolved within 30 minutes. During the neutralization reaction the color of the solution gradually changed from a pale lemon yellow to a bright orange. This reaction may be represented as:

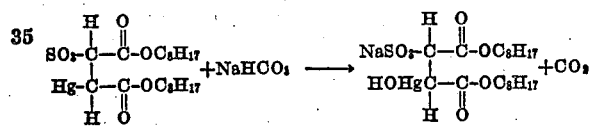

The solution was filtered with a filter aid and the solvent evaporated at room temperature. 137 parts of a bright orange waxy solid was obtained which contained about one-half unchanged dioctyl sodium sulphosuccinate since only one-half the theoretical amount of HgO was added during the reaction.

Analysis of the product gave values of 19.69% for Hg and 5.12% for S. The product was completely soluble in ether, toluene, hexane, and carbon tetrachloride but only slightly soluble in alcohol and water. Dilute aqueous solutions had a pH of about 5.0 and foamed copiously.

The surface active properties of the product of this example were demonstrated in the standard Draves Sinking Test conducted at 30° C. in which the sinking time of a skein of unbleached cotton yarn is given in seconds.

| | Concentration in grams per liter | | |
|---|---|---|---|
| | 1.0 | 0.5 | 0.25 |
| | Sec. | Sec. | Sec. |
| Dioctyl sodium sulphosuccinate | | 12 | 30 |
| Mercury derivative of dioctyl sodium sulphosuccinate | 8.1 | 13.3 | 42 |

*Example 2*

A product was prepared by the method described in Example 1 except that one mole of HgO was used for each mole of dioctyl sodium sulphosuccinate. This product contained 25.4% Hg and 12.35% SO₃. The wetting properties of this material were even better than the product of Example 1 and equalled the wetting power of dioctyl sodium suphosuccinate.

Example 3

30.2 parts of octyl sodium beta-sulphobutyrate was dissolved in isopropyl ether, cooled to 4° C. and 13 parts by weight of concentrated HCl added. After standing for a few hours the NaCl formed was filtered off. 22.0 parts by weight of HgO was added to the filtrate and the mixture allowed to stand for 15 hours with constant agitation at a temperature of about 5° C. The excess HgO was then removed by filtration and the filtrate neutralized with 8.4 parts of $NaHCO_3$.

The product recovered by evaporation of the filtrate was an orange colored waxy solid slightly soluble in water and easily soluble in organic solvents. It contained 28.6% Hg upon analysis.

Example 4

22.5 parts of diamyl sodium alpha-sulphosebacate was dissolved in isopropyl ether, the solution cooled to about 4° C. and 35 parts by weight of concentrated HCl added. After standing for several hours the NaCl formed was filtered off. The filtrate was agitated for about 8 hours with 60 parts of HgO and then filtered. The filtrate evaporated to a dark brown sticky oil containing considerable quantities of organically combined mercury.

Example 5

38.8 parts of di(methyl-amyl) sodium sulphosuccinate was dissolved in isopropyl ether and the solution cooled to about 4° C. 13 parts by weight of concentrated HCl was added with agitation and the mixture allowed to stand for several hours. The NaCl formed in the reaction was filtered off. The filtrate was agitated with 21.6 parts of yellow HgO for 24 hours at a temperature of about 4° C. and then allowed to stand at this temperature for 44 additional hours. The excess HgO which had settled out was removed by filtration and 8.5 parts of $NaHCO_3$ were added to the filtrate with agitation. After filtration the solution was evaporated on a steam bath.

The product obtained was a rather brittle orange colored solid capable of being ground to a yellow powder at ordinary temperatures. It contained 30.0% of Hg upon analysis. This product was somewhat more water-soluble than the dioctyl derivatives described in Examples 1 and 2.

Example 6

138 parts of diethyl sodium sulphosuccinate was dissolved in isopropyl ether and the solution cooled to 4° C. 65 parts by weight of concentrated HCl was added to the cool solution with agitation and allowed to stand for several hours. NaCl was filtered off and 110 parts of yellow HgO was added with agitation and cooling. 42 parts of $NaHCO_3$ was added to the mixture and when the product was neutral in water solution to brom phenol blue the excess HgO and $NaHCO_3$ was filtered off. The filtrate was evaporated to a sticky orange colored semi-solid, slightly soluble in water and readily soluble in common organic solvents. Upon analysis it is found to contain 29.2% of mercury.

What I claim is:

1. A method of preparing mercury derivatives of alkyl, cycloalkyl and aryl sulphosuccinates which comprises the steps of reacting a suphosuccinate from the group consisting of alkyl, cycloalkyl and aryl sulphosuccinates dissolved in an inert organic solvent with HgO and neutralizing the product with a mild alkali.

2. A method of preparing mercury derivatives of a dioctyl sulphosuccinate which comprises the steps of reacting a dioctyl sulphosuccinate dissolved in an inert organic solvent with HgO and neutralizing the product with an alkali bicarbonate.

3. A method of preparing mercury derivatives of di(methyl amyl) sulphosuccinate which comprises the steps of reacting di(methyl amyl) sulphosuccinate dissolved in an inert organic solvent with HgO and neutralizing the product with an alkali bicarbonate.

4. A method of preparing mercury derivatives of diethyl sulphosuccinate which comprises the steps of reacting diethyl sulphosuccinate dissolved in an inert organic solvent with HgO and neutralizing the product with an alkali bicarbonate.

5. Mercury derivatives of alkyl sulphosuccinates resulting from the neutralization with a mild alkali of the reaction product of HgO and an alkyl sulphosuccinate, said derivatives being thick viscous liquids to hard waxy solids, soluble in most organic solvents and of moderate to slight solubility in water and alcohol.

6. Mercury derivatives of alkyl sulphosuccinates resulting from the neutralization with sodium bicarbonate of the reaction product of HgO and an alkyl sulphosuccinate, said derivatives being thick viscous liquids to hard waxy solids, soluble in most organic solvents and of moderate to slight solubility in water and alcohol.

7. The mercury derivative of dioctyl sulphosuccinate resulting from the neutralization with a mild alkali of the reaction product of HgO and dioctyl suphosuccinate, said derivative being a hard, wax-like solid, soluble in most organic solvents but sparingly soluble in water and alcohol.

8. A method of preparing mercury derivatives of dialkyl esters of sulphosuccinic acid which comprises the steps of reacting a dialkyl sulphosuccinate dissolved in isopropyl ether with HgO and neutralizing the product with a mild alkali.

9. The method of preparing mercury derivatives of dioctyl esters of sulphosuccinic acid which comprises the steps of reacting dioctyl sulphosuccinate dissolved in isopropyl ether with HgO and neutralizing the product with an alkali bicarbonate.

10. Mercury compounds of the group consisting of mercury derivatives of alkyl, cycloalkyl and aryl esters of sulphoaliphatic carboxylic acids resulting from the neutralization with mild alkali of the reaction product of HgO and an ester of the group consisting of alkyl, cycloalkyl and aryl esters of sulphoaliphatic carboxylic acids, said compounds being thick, viscous liquids to hard waxy solids, soluble in most organic solvents and of moderate to slight solubility in water and alcohol.

11. Mercury derivatives of alkyl esters of sulphoaliphatic dicarboxylic acids resulting from the neutralization with a mild alkali of the reaction product of HgO and an alkyl ester of a sulphoaliphatic dicarboxylic acid, said derivatives being thick, viscous liquids to hard waxy solids, soluble in most organic solvents and of moderate to slight solubility in water and alcohol.

KATHRYN L. LYNCH.